United States Patent
Ang et al.

(10) Patent No.: US 6,669,970 B2
(45) Date of Patent: *Dec. 30, 2003

(54) METHOD OF FEEDING FISH

(75) Inventors: Keng P. Ang, New Westminster (CA); Royann J. Petrell, Courtenay (CA); Beryl March, Vancouver (CA)

(73) Assignee: The University of British Columbia, Vancouver (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,366

(22) Filed: Jun. 9, 1998

(65) Prior Publication Data

US 2003/0059494 A1 Mar. 27, 2003

Related U.S. Application Data

(60) Provisional application No. 60/049,229, filed on Jun. 9, 1997.

(51) Int. Cl.⁷ .......................... A01K 61/02; A23L 1/325
(52) U.S. Cl. ............................................. 426/2; 426/805
(58) Field of Search ............................... 426/1, 805, 2, 426/540

(56) References Cited

U.S. PATENT DOCUMENTS

| | | | |
|---|---|---|---|
| 3,719,496 A | * 3/1973 | Chen et al. | |
| 4,144,353 A | * 3/1979 | Zaragoza | 426/1 |
| 4,599,820 A | * 7/1986 | Hill | 43/4.5 |
| 4,728,514 A | * 3/1988 | Lechnir | 426/1 |
| 5,415,862 A | 5/1995 | Bethshears et al. | 424/410 |

FOREIGN PATENT DOCUMENTS

| | | |
|---|---|---|
| EP | 0330427 A | 8/1989 |
| JP | XP002083205 | 5/1981 |
| JP | 03280841 | 12/1991 |
| JP | XP002083206 | 6/1995 |
| WO | WO94/18932 | 9/1994 |

OTHER PUBLICATIONS

Food Chemical News, FDA Clears Astaxanthin As Color Additive in Fish Feed., 00015–6337, Apr. 17, 1995.*
Journal article, "Improvement in the Feeding Efficiency of Larval, Post Larval . . . ", Dendrinos et al, 8 pages, 1984.
"Effects of Prey Color and Background Color on Feeding by Atlantic Salmon Alevins". *The Progressive Fish Culturists.* Canada. 1987.
"Choice of Colors of Food Items by Rainbow Trout". *Journal Fisheries Research Board of Canada.* Canada. 1973.
"Visual System of Fish". Douglas and Djamgoz. (Chapman and Hall). 1990.

* cited by examiner

Primary Examiner—Arthur L. Corbin
(74) Attorney, Agent, or Firm—John Russell Uren (57) ABSTRACT

An enhanced fish feed and a method of feeding fish with the enhanced feed are described for particular use in fish farms. The fish feed comprises pellets which are coated with a material intended to contrast highly with conditions within cages of the fish farm and thereby become visible to fish below the surface and humans near the surface. A coating of white material, preferably a mica/titanium dioxide compound, is appropriate. The enhanced visibility of the feed increases the water feeding volume within the enclosure. This reduces fish congestion and stress upon the fish during the feeding period and increases feeding rate.

8 Claims, 4 Drawing Sheets

METHOD OF FEEDING FISH

CROSS-REFERENCE TO RELATED APPLICATION

This application claims priority from U.S. provisional application Ser. No. 60/049,229 filed Jun. 9, 1997.

This invention relates to enhanced fish feed and, more particularly, to a method for feeding fish and the enhanced fish feed used during such feeding.

BACKGROUND OF THE INVENTION

With the reduction in fish stocks worldwide, the raising of aquatic organisms for domestic and international consumption has taken on increased importance. The principal fish species farmed are salmon and trout although other species are also raised, such species including yellowtail, sea bass, perch and the like. Salmon and trout, among others, are carnivorous and rely entirely upon the high protein and energy content of their feed for their growth and health.

Fish are usually raised in fish farms which are situated in open and closed bodies of water including tanks, coastal and freshwater bodies and raceways. The fish farms comprise a plurality of pens, cages or other enclosed areas which constrain the fish and in which the fish are fed and raised. The fish in the enclosures are fed regularly, conveniently by scattering the fish feed on the surface of the water in each of the individual fish enclosures from walkways in a more or less uniform fashion, frequently using a broadcast type feeder or manually by hand. Several techniques exist to determine when to stop feeding, including surface feeding visibility of the feed, pellet sensing devices and monitoring ration size.

When feeding fish without a pellet sensing device, the feeding rate and amount is judged based on surface feeding activities of fish such as splashing and mouthing as viewed by the farmer from the surface. Feeding is stopped or the rate is reduced if pellets are not consumed before they fade into the water column.

Manufactured feeds for farmed fish are normally produced by a process of blending and grinding the ingredients followed by forming the ingredients into pellets. The term "pellets", however, in this specification as well as the term "feed" is intended to be inclusive of any particle intended to be ingested by fish and variously formulated, including pressed pellets, crumbs, moist feeds, and non-feed particles which may include tablets containing drugs, vaccines, or other substances. The pellets may be coated with fish oil in order to achieve the desired nutritional profile. The feed pellets produced and typically presently used for feeding fish are normally a dark brown color.

There are, however, problems with present fish feeding techniques and with the feed used in such feedings.

Brown pellets are not readily visible from the surface, underwater at depths, under poor water visibility conditions or low lighting conditions. Making pellets more visible (e.g., increasing the contrast of the pellet) will allow farmers to view pellets for a longer period of time as they fade into the water column and therefore offer better control of feed ration and feeding rate. Feeding competition among fish can be reduced and feeding rate can be increased if more fish can see and consume pellets at the same time.

Compared to land animal feeds, salmon and trout feeds are relatively expensive and it is important from a costing and economic point of view that the fish farmer avoid feed wastage by way of overfeeding and underfeeding. In the case of fish reared in sea cages, it is difficult to avoid both over and underfeeding as the conventional dark brown fish feed pellets may not be seen at depth, particularly under conditions of water turbidity, low light conditions such as are present during cloudy days and "shading" in the cages due to the presence of fish.

The siting of fish farms using pens or cages in sheltered locations is also environmentally sensitive. The accumulation of waste feed and fish faeces may lead to nutrient-rich conditions in sediments beneath the fish cages. This can lead to an oxygen imbalance in the area with its concomitant deleterious ecological effects. It is believed that feed waste is normally around 5% or even greater of the feed given. Overfeeding (feeding in excess of the voluntary appetite of fish) wastes feed and pollutes the environment due to feed pellets falling to the sea bed and contributing unwelcome nutrients. This feed wastage also leads to an increase in the amount of feed required per unit weight gain in fish ("FCR"). Underfeeding results in lost growth of fish, health problems for fish and, if severe enough, to increased FCR.

Feed ration size varies from meal to meal and from day to day and it is a continuous challenge for fish farmers to know when to stop feeding and the optimum amount of feed to use. Feed tables and surface viewing of the pellet by the farmer or operator while feeding are known to be inadequate techniques and result in a lack of control over ration size. However, these methods are common. Currently, the production of one tonne of salmon or trout requires between 1.1 and 1.3 tonnes or higher of fish feed, and various species of fish, such as the Chinook salmon, may require additional quantities than, for example, the Atlantic salmon. Clearly, the economics of such feeding are of considerable importance to the profitability of fish farms.

In an effort to better control the ration size dispersed during feeding as well as the feeding rate, various pellet sensing devices such as infrared, uplift feedback and underwater cameras have been used with varying success. Underwater cameras have been located in the enclosures generally below the feeding area. When the fish are finished feeding, an increased number of pellets will be observed by the camera dropping through the volume of water where the principal feeding is taking place. When the increase in wasted pellets is observed, the farmer will end the feeding. While this assists the control of ration size, it does nothing to deal with the problems of damage to the fish located in the fish feeding area and the natural reluctance of less aggressive fish to compete for feed.

A number of studies have been published which demonstrate that the color of food items can affect the feed intake of fish. Ginetz and Larkin ("Choice of colors of food items by rainbow trout (*Salmon gairdneri*).", *J.Fish Res.Board Can.* 30:229–234) disclosed that the preference of trout for prey of different colors was affected by the background and indicated that salmonids possess keen color discrimination or awareness of contrast between the prey and the background. They further demonstrated that the preference of prey of different colors changed with changing light levels. Against a pale green background, blue food items were preferred in daylight while yellow was preferred at low light levels. Douglas and Djamgoz ("The Visual System of Fish", *Chapman and Hall* 1990) taught that the contrast of an object between it and its environment allows for greater detection of the object and this contrast may be a difference of shape, pattern, texture, color or brightness. Browman and Marcotte ("Effects of prey color and background on feeding by Atlantic salmon alevins." *Prog.Fish.Cult.* 49:140–143 (1987)) disclosed that the background color in aquaria affected choice of prey based on color by fish.

Further difficulties are present using current feeding techniques. First, due to high fish densities which lead to the aforementioned shading in fish cages, there is great competition for the feed among the fish along the surface of the water or in the upper areas directly adjacent the surface where the fish feed is initially distributed. This results in injuries to the feeding fish such as scale loss. This may increase disease and mortality and reduce the quality of the fish. Second, less aggressive fish find that food is unavailable or that there is reduced food available to them during the feeding period, which results in a larger size distribution of the fish. This may reduce fish uniformity which uniformity is desirable for commercial exploitation. Third, since the water darkens as the depth of the water increases, feed may no longer be visible to fish below a certain depth despite being available in sufficient quantities. Fourth, shading is a particular problem with higher fish populations in the cages. This shading reduces the visibility of the feed within the cages in addition to the atmospheric or water turbidity conditions. Because fish, particularly salmon and trout, are primarily visual feeders and rely upon their power of vision to locate feed, these factors take on some considerable importance.

Yet still further problems with existing fish feed are quality control and nutrient content. These problems are heightened as it is desired to have a high energy fish feed with a high fat content. The feed is produced in large quantities using a continuous production process. The fat is added to the dry pellets in a batch mixer that utilizes a vacuum technology to ensure penetration of the oil evenly throughout the pellet filling all the pores in the pellet with fat. As all of the pores become filled with fat and not air as a consequence of the vacuum drawn on the pellet, the incidence of floating feed is reduced. Floating feed is not advantageous since more fish will be concentrated near the surface leading to the aforementioned aggressive and stressful feeding conditions. Likewise, with high energy high fat feed, fat leakage is a problem. Using the aforementioned vacuum technology to ensure even penetration of the fat throughout the pellet helps reduce the amount of fat leakage from the pellets.

Previous techniques in the production of fish feed utilised a continuous coating process. If a quality control problem arose, it was difficult to identify the particular feed exposed to the problem and it was also difficult to achieve the correct amount of fat dose to the pellets. The lack of control of fat dose resulted in working conditions less than optimal and oil spills on production equipment contributed to down time, increased maintenance costs and wastage of fish oil.

SUMMARY OF THE INVENTION

According to one aspect of the invention, there is provided an enhanced visibility fish feed for fish ingestion within an enclosure of a fish farm, said enhanced fish feed having significantly improved visibility relative to unenhanced fish feed within said enclosure, said significantly greater visibility being obtained by changing the color and/or reflectivity of said unenhanced fish feed.

According to a further aspect of the invention, there is provided a method of feeding fish within the enclosure of a fish farm with enhanced fish feed having significantly improved visibility relative to the visibility of unenhanced fish feed comprising the steps of selecting said enhanced fish feed and distributing a quantity of said enhanced feed on the surface of the water in said enclosure. fish feed for feeding fish within an enclosure of a fish farm, said fish feed being of a predetermined quantity and having a predetermined contrast with the water conditions within said enclosure.

According to yet a further aspect of the invention, there is provided a method of increasing the fish feeding volume of water below the water surface and within an enclosure of a fish farm, said method comprising determining the depth visibility of fish feed to an operator according to water conditions within said enclosure and correlating said depth visibility to said operator with a known relationship between said depth visibility to said operator and the depth visibility of said feed to fish, and thereafter distributing an enhanced fish feed of appropriate visibility on the surface of said water within said enclosure.

BRIEF DESCRIPTION OF THE DRAWINGS

Specific embodiments of the invention will now be described, by way of example only, with the use of drawings in which.

DESCRIPTION OF PREFERRED EMBODIMENT

Figure 1:
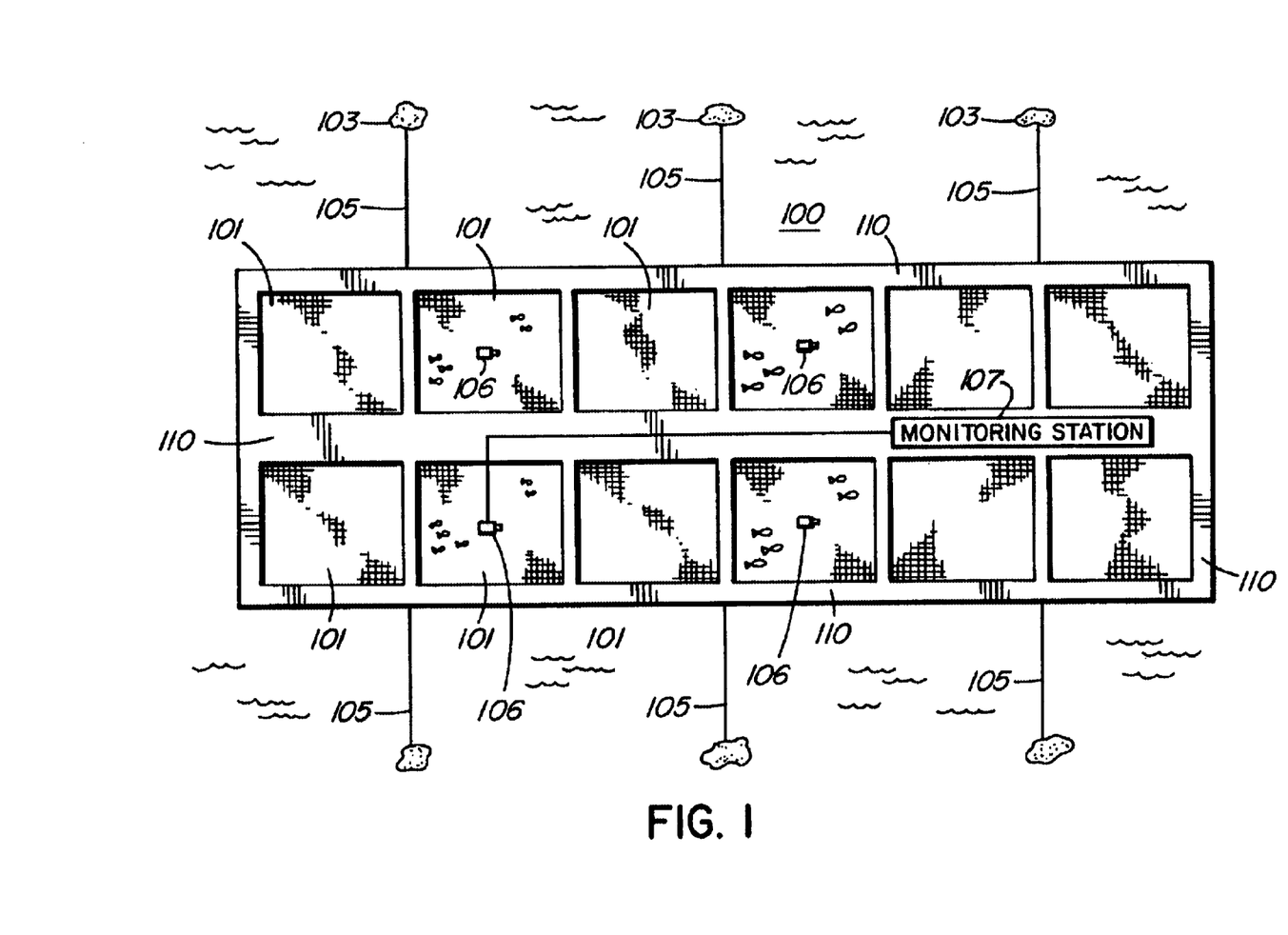
FIG. 1 is a diagrammatic isometric view of a typical fish farm used for raising fish particularly illustrating a plurality of fish cages and the walkway surrounding the fish cages.
Figure 2:
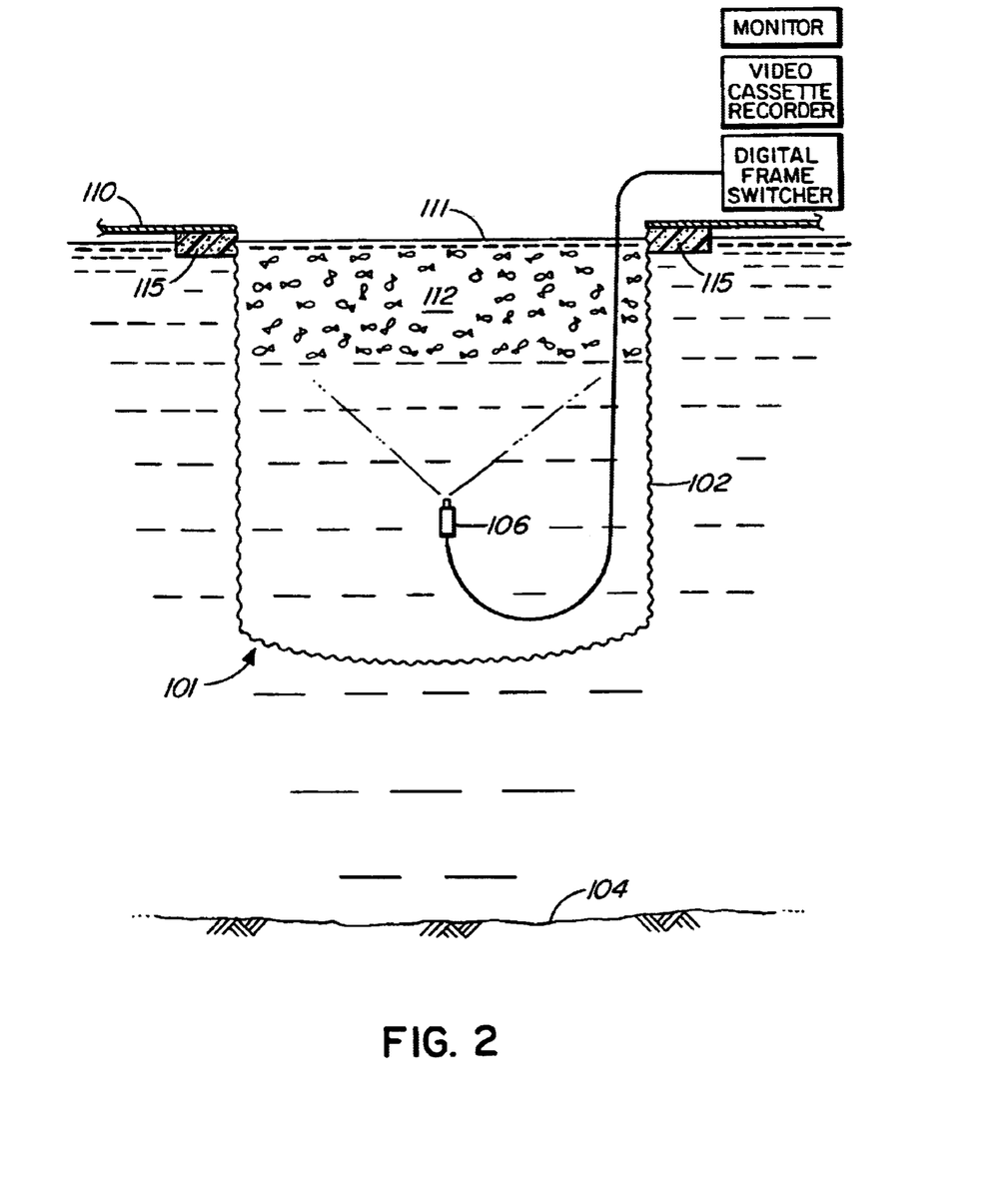
FIG. 2 is a diagrammatic side view of a single one of the cages particularly illustrating the fish feeding volume within the cage.

With reference now to the drawings, a fish farm is illustrated generally at 100 in FIG. 1. It comprises a plurality of individual cages, enclosures or pens 101, each of the cages 101 being enclosed on all sides and on the bottom by netting 102 (FIG. 2), the netting being used to constrain the fish within the individual cages 101. The cages 101 are anchored by anchors 103 securely located on the ocean bottom 104 and stays in the form of ropes and/or cables 105 extend from the anchors 103 to the cages 101 thereby securely holding the cages 101 in place in their operating location. Walkways 110 extend along the top of the cages 101 and the fish within the cages 101 are fed from the walkways 110 by scattering fish feed in a more or less uniform fashion onto the surface of the water in each of the cages 101. Cameras 106 are positioned within the respective cages 101 to monitor the feed consumption from a monitoring station 107.

The surface of the water 111 (FIG. 2) is below the walkways 110 which serve to support the operator and other equipment. Walkways 110 are positioned and connected to buoyant material 115. The fish generally illustrated at 112 are concentrated in the upper portion of the cages 101, particularly when the fish 112 are being fed from the walkways 110. Camera 106 is positioned beneath the feeding volume to observe the feeding behavior of the fish 112.

As the depth of the water within the cages 101 increases, the fish feed tends to become less visible to the feeding fish and this condition is exacerbated under conditions of high water turbidity or low light conditions and, further, when there is shading within the cages 101 caused by the presence of fish 112, which shading increases as the quantity of fish 112 within the cages 101 increases and/or structures such as walkways 110 and the density of the netting 102 itself interfere with lighting. These effects are set forth in the charts of FIGS. 3A, 3B and 3C. Thus, although the quantity of feed available for the fish 112 may be entirely sufficient, a certain quantity is left uneaten due to the described visibility problems of the feed to the fish or because feeding rates have been reduced to prevent the feed loss.

Figure 3A:
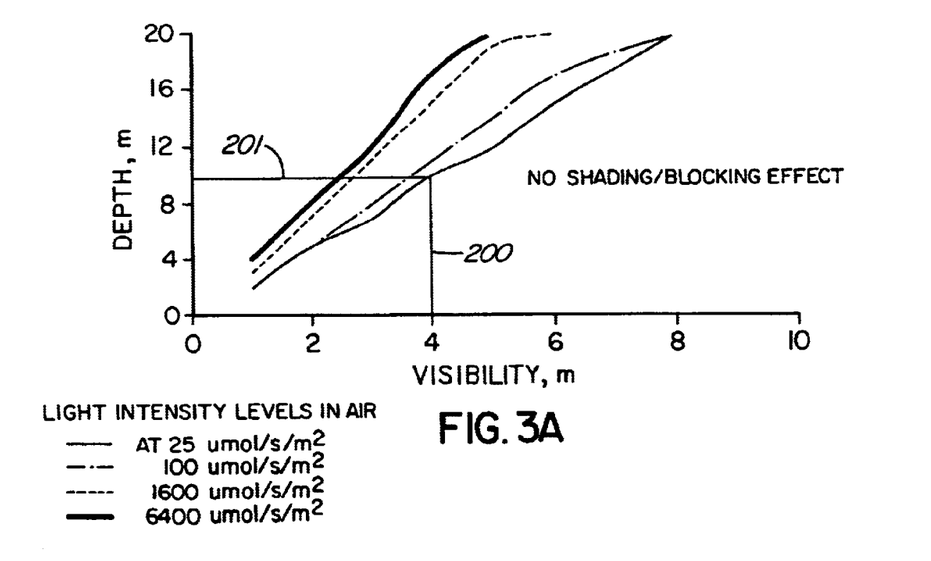
FIGS. 3A, 3B and 3C are charts illustrating the depths below which enhanced feed according to the invention is useful under various light and water visibilities, FIG. 3A being applicable when no shading due to the presence of fish is present and FIGS. 3B and 3C illustrating increased shading due to the quantity and presence of fish.

Reference is now made to FIG. 3A. The fish farmer, for example, is aware that the day is wintry with relatively low light intensity (25 micromol/s/m2) and he determines that his feed visibility is approximately 4 meters deep within the cage 101. This depth may be arrived at by lowering an object into the cage 101 or, after some period when familiarization has occurred, of using dead reckoning or a permanently installed depth indicator to correlate his feed visibility with depth of the water within the cage 101. A vertical line 200 is drawn from the 4 meter dimension on the abscissa of FIG. 3A and intersects with the 25 umol/s/m2 visibility curve. From this point of intersection, a horizontal line 201 is extended to the ordinate and intersects it at approximately the 10 meter depth. This indicates that the feed is not as detectable as contrast-enhanced feed to the fish beyond this depth. Enhanced feed according to the invention would be more visible below this depth and, if desired, could be usefully applied by the farmer under these conditions allowing the fish 112 to view the feed below the bottom of the feeding volume illustrated in FIG. 2 thereby increasing the feeding volume and feeding rate resulting in the advantages earlier set forth.

Figure 3B:
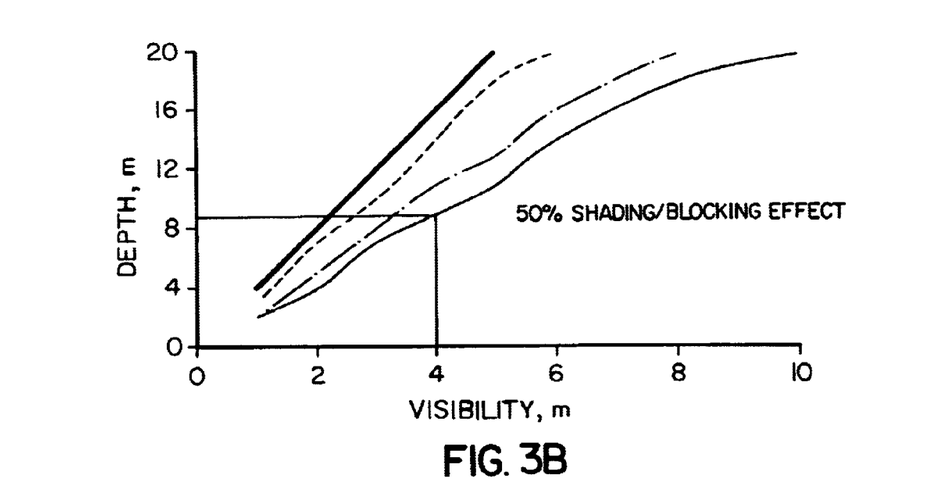
Figure 3C:
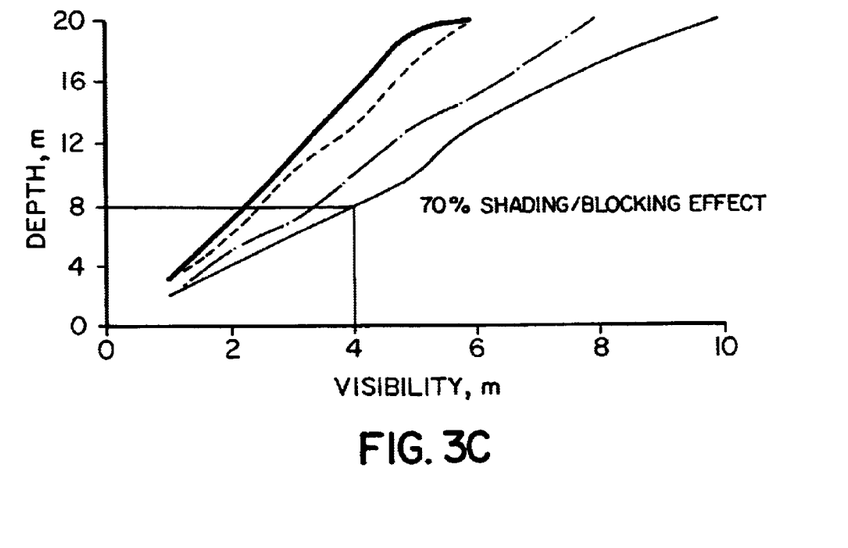

With reference to FIGS. 3B and 3C, it will be likewise seen that as shading increases within the cages 101 due to the presence of fish, the visibility of the feed to fish correspondingly decreases. Thus, enhanced feed according to the invention is beneficial at higher depths within the cage.

Tables 1 and 2 below illustrate the visible distance to humans of different fish feed types of pellets under relatively low light conditions and clear water at 0.4 meter and 1.5 meter depths, respectively. From Table 1, it can be seen that white pellets may be viewed at the furthest distance with brown pellets only being seen beyond a minimum distance at both depths. Table 2 is similar to Table 1 but under more turbid water conditions.

TABLE 1

Maximum visible distance (human vision) of different pellet types under low ambient light (0.03 micromol/s/m2) and clear (9.35 NTU) seawater conditions at two(2) depths

| | Depth: 0.4 m depth Underwater light level: 0.017 micromol/s/m2 | | Depth: 1.5 m depth Underwater light level: 0.017 micromol/s/m2 |
|---|---|---|---|
| Pellet type | Max. visible distance (cm) | Pellet type | Max. visible distance (cm) |
| White | 460 | White | 274 |
| Fluorescent yellow | 458 | Fluorescent yellow | 272 |
| Fluorescent red | 439 | Fluorescent red | 269 |
| Fluorescent orange | 429 | Fluorescent orange | 268 |
| Fluorescent blue | 425 | Yellow | 245 |
| Silver/reflective | 398 | Silver/reflective | 239 |
| Fluorescent green | 375 | Fluorescent green | 228 |
| Natural guanine | 238 | Fluorescent blue | 216 |
| Yellow | 220 | Natural guanine | 206 |
| Sparkly/speckled | 146 | Orange | 180 |
| Gray | 144 | Sparkly/speckled | 141 |
| Orange | 143 | Blue | 134 |
| Uncoated | 139 | Eggplant | 124 |
| Blue | 123 | Gray | 123 |
| Red | 121 | Uncoated | 121 |
| Green | 119 | Red | 115 |
| Brown | 116 | Brown | 112 |
| Eggplant | 112 | Green | 108 |

TABLE 2

Maximum visible distance (human vision) of different pellet types under low ambient light (0.03 micromol/s/m2) and silted (21.8 NTU) seawater conditions at two(2) depths

| | Depth: 0.4 m depth Underwater light level: 0.012 micromol/s/m2 | | Depth: 1.5 m depth Underwater light level: 0.006 micromol/s/m2 |
|---|---|---|---|
| Pellet type | Max. visible distance (cm) | Pellet type | Max. visible distance, cm |
| Red | 153 | Eggplant | 155 |
| Eggplant | 147 | Red | 151 |
| White | 143 | Blue | 148 |
| Blue | 143 | Sparkly/speckled | 147 |
| Gray | 142 | Green | 145 |
| Green | 141 | White | 145 |
| Brown | 140 | Gray | 141 |
| Fluorescent yellow | 134 | Brown | 139 |
| Uncoated | 134 | Uncoated | 136 |
| Sparkly/speckled | 134 | Fluorescent yellow | 136 |
| Orange | 132 | Silver/reflective | 129 |
| Silver/reflective | 131 | Natural guanine | 127 |
| Natural guanine | 131 | Fluorescent blue | 126 |
| Yellow | 131 | Orange | 125 |
| Fluorescent blue | 123 | Fluorescent green | 124 |
| Fluorescent red | 115 | Yellow | 120 |
| Fluorescent orange | 115 | Fluorescent red | 119 |
| Fluorescent green | 114 | Florescent orange | 116 |

In clear seawater under low light conditions, the normal brown pellets were visible at approximately 1.0 meter while many coated pellets were visible at greater than 2.0 meters as viewed in Tables 1 and 2.

Under bright light typical of near surface conditions in a fish enclosure, many coated pellets are over three times more reflective than regular brown pellets as viewed in Table 3 below thus aiding a farmer to make judgements of increased accuracy concerning the quantity of feed to give the fish.

TABLE 3

Approximate reflectance (%, in descending order of magnitude) of uncoated and different coated pellet types against a black background under high light (12.75 micromol/s/m2; diffused light from a 1000 W halogen lamp)

| Pellet type | Reflectance Values (%) |
|---|---|
| Fluorescent Yellow | 36 |
| White | 34 |
| Fluorescent orange | 30 |
| Fluorescent red | 26 |
| Yellow | 22 |
| Silver | 19 |
| Orange | 13 |
| Natural guanine | 11 |
| Red | 11 |
| Sparkles | 10 |
| Gray | 8 |
| Fluorescent green | 8 |
| Brown | 8 |
| Eggplant | 7 |
| Fluorescent blue | 7 |
| Green | 7 |
| Regular uncoated | 6 |
| Blue | 5 |

Tables 4 and 5 below illustrate responses made by fish under low light and clear water and low light and turbid water conditions, respectively. The pellet types are listed and the fish responses are compared to responses to normal brown pellets. The resulting conclusion is that the lighter colored pellets or the reflecting or guanine coated pellets have much better visibility to fish due to the large increases in responses by fish to the more desirable pellet colors as opposed to the normal brown pellets.

TABLE 3

| Pellet Type | Response: Regular | Response: Coated | Percent more detectable than regular pellet | # of times more detectable than regular pellet |
|---|---|---|---|---|
| White | 15 | 102 | 580 | 6.8a |
| Green | 65 | 53 | 0 | — |
| Red | 46 | 54 | 17.4 | — |
| Silver/reflective | 23 | 94 | 308.7 | 4.1b |
| Natural guanine | 26 | 94 | 261.5 | 3.6b |

Responses from detectability tests (fish vision) conducted under low light (0.007 micromol/s/m2) and clear water (3.6 NTU).
a,bResponses with different letters are significantly different (Chi/2 tests, alpha = 0.05) from each other.
Underscored coated responses are significantly different (Chi/2 tests, alpha = 0.05) from regular pellets.

TABLE 4

| Pellet Type | Response: Regular | Response: Coated | Percent more detectable than regular pellet | # of times more detectable than regular pellet |
|---|---|---|---|---|
| White | 3715 | 92 | 148.6 | 2.5a |
| Green | 58 | 76 | 31.0 | — |
| Red | 52 | 54 | 3.8 | — |
| Silver/reflective | 40 | 91 | 127.5 | 2.3b |
| Natural guanine | 30 | 80 | 166.7 | 2.7b |

Responses from detectability tests (fish vision) conducted under low light (0.007 micromol/s/m2) and turbid water (20.1 NTU).
a,bResponses with different letters are significantly different (Chi/2 tests, alpha = 0.05) from each other.
Underscored coated responses are significantly different (Chi/2 tests, alpha = 0.05) from regular pellets.

Against black background, typical of deep water or top down views, the contrast of silver (mica coating) and white coatings are over four(4) times than of regular brown pellets due to the higher reflectivity of the coatings as viewed in Table 6.

TABLE 6

Contrast values of different pellet types compared to a regular or normal brown or unenhanced pellet with different background values under bright light

| Pellet Type | Blue background | Black background | White background |
|---|---|---|---|
| Silver | 0.03 | 2.66 | −0.37 |
| Regular Brown | −0.89 | −0.62 | −0.93 |
| Guanine | 0.04 | 2.70 | −0.36 |
| White | 0.69 | 5.03 | 0.04 |

Conveniently, therefore, the enhanced pellets will be preferably white, a reflective material such as silver or an otherwise light colored material having the color guanine (which is a color similar to the color of fish scale) and any material that increases the visibility of pellets for human and/or fish. These pellets are produced by many materials (e.g., mica and/or titanium) as a surface coating of the pellets or added as additives in with the materials in the feed, provided the coating or additives are not detrimental to the fish. Suitable coatings include a thin layer of a high reflective mica and/or titanium dioxide which can all produce a silver-white reflective sheen which it is contemplated will not only be of enhanced visibility to the fish but which will also stimulate the fish appetites since it is known fish appetites are stimulated by visual signals. Because, in particular, salmon and trout are primarily visual feeders relying upon their powers of vision to locate feed, improving the visibility of the feed by increasing contrast is contemplated to provide benefits. Thus, the mica and titanium dioxide coating, conveniently in a range of from 0.3 to 0.5% should improve the visibility of fish feed and reduce the frenzy or competition for food over the initial depths of the fish cage by increasing the depths at which the feed is seen by the fish and by being readily available for fish located in the deeper and/or less visible regions of the pens.

The principal constituents of mica-titanium dioxide are oxides and hydroxyls of aluminium, potassium, silicon and titanium. These constituents are highly inert substances with high melting points and are insoluble in water and acids. Because of the chemical inertness of mica and titanium dioxide, the substances cannot be digested by animals and there is and should be no evidence of toxicity or carcinogenicity.

A known compound of the two materials, mica and titanium dioxide in the ratio of 81.5% (76–87%) and 18.5% (13–24%), respectively, is known as Mearlin MangaPearl 5000 although there exists a family of similar compounds and materials commonly known as pearlescent pigments which may be colored to combine reflectance with color and so be used to increase the visibility of the feed particles. The manufacturing process results in the mica being coated with titanium dioxide and the physical appearance is a fine, silvery powder having a particle size of 32.8–37.8 micron with a density of 3.2 kg/l or 27 lbs/gal. The production process is set forth in greater detail hereafter.

The mica/titanium dioxide coated pellets reflect white light and, as such, they had the highest contrast against all background and thus were the desired feed. The reflected light from the enhanced feed increased the ability of the fish and the farmer to see the feed in the water which allowed the farmer to more clearly see when the fish have stopped feeding and thereby avoid overfeeding. The chances of underfeeding are also minimised using the enhanced feed.

Thus, the depth over which the feed is visually apparent, particularly to the fish, is contemplated to result in an increased depth or increased water volume for feeding fish and whereas using the dark brown pellets of the prior art resulted in somewhat of a frenzy by the fish in the upper water levels when being fed, it is contemplated that there will be less competition at the surface since feed will be readily available and visible to fish at lower depths resulting in less competition and better feeding distribution to the fish.

Operation

In operation, an operator of the fish farm 100 will attend to the feeding of the fish 112 within the farm 100 at regular feeding hours. It will be assumed that the operator has available to him a quantity of both brown and enhanced light colored pellets making up the feed.

The operator will review the ambient light conditions and water color within the farm by inspection. Such light and water conditions may be obtained by instrumentation or, after a period of time, from experience. The operator will also determine the turbidity of the water within the farm 100 conveniently by sampling the water. The operator will further have information available relative to the shading of the farm 100 due to the quantity of fish within the individual enclosures 101 of the farm 100. A camera 106 may conveniently be used to obtain the shading information or the information may be obtained from shading charts. Finally, the operator will require the depth visibility of pellets to him. This information conveniently may be obtained by manually lowering the feed in the form of pellets to a depth where they are no longer visible and measuring this depth.

With this information in hand, the operator will consult charts similar to those set forth in FIGS. 3A, 3B and 3C. These charts will advise the operator of the depth at which normal pellets are visible to the fish 112. If added depth is required within which the fish are intended to feed, the operator may use a quantity of enhanced feed of lighter color, conveniently white, reflective, silver or guanine by itself. Alternatively, and depending on the results in using enhanced feed, the operator may decide to combine portions of normal or brown pellets with portions of enhanced light colored feed. Since such feed is normally in the form of pellets, the enhanced feed will be similar to the normal feed in every way except in its contrast with water conditions within the cage. That contrast is enhanced thereby improving the visibility to the fish by the light color of the feed. The light may come from a coating, conveniently a mica and/or titanium dioxide coating, over the normal or brown feed pellet. The use of this combined feed would allow the fish in the upper regions to feed on the usual brown feed in a normal manner with the fish in the lower regions of the cage feeding on the enhanced and light or silver colored feed pellets. It is contemplated that with enhanced visibility of the feed, less aggressive fish may simply await the passage of enhanced feed through the usual feeding areas since whereas the normal brown feed would not be visible in such regions where the less aggressive fish await, the use of enhanced feed would be so visible and available for feeding purposes.

Reference is now made to FIG. 4 wherein a batch manufacturing process for producing the fish pellets according to the invention is generally illustrated at 200, which process has a current capacity of approximately ten (10) tonnes/hour. It is proposed that each tonne of feed will contain approximately three(3) kilograms of titanium dioxide coated mica.

Dry pellets (not illustrated) are transported with conveyor 201 into a screen 202 where the dust or small and undersize particles are separated. The full size particles fall to a buffer bin in pre-cooler 203 where a feeder 204 feeds the pellets into a weigh bin 210. In the event the pellet is cracked or undersize in the pre-cooler 203, a vacuum system 211 is provided which will return the pellet to the dust return tank (not illustrated) downstream of screen 202.

The proper quantity of pellets to be coated will be determined by the weight bin 210 and this quantity will fall freely from the weight bin 210 to the mixer or coater 212. The correct amount of fish oil to add to the pellets is provided by a second weigh tank 214 located above the coater 212. The correct amount of oil is therefore sprayed into the coater 212 during the vacuum process used in the coater 212. Thus, the batch coating processing system is useful in giving enhanced accuracy of the fat dose.

A combination of lighter and darker pellets might be useful in certain conditions. For example, near the surface, both pellets would be readily and visually identifiable by the fish. Thus, if both are similarly visible, the feed is contemplated to be ingested proportionately to the amount of feed initially deposited on the surface. If a higher proportion of white feed relative to the dark feed is deposited, most of the dark feed would be eaten leaving the white feed to move downwardly to the lower depths of the fish pen and thereby to be available to the fish at lower depths. By using proper ratios of white and dark pellets, it is contemplated that more even feeding would result with less wastage of feed and providing the same nutrient levels to fish throughout the pen.

Although the invention has been particularly described in relation to feed for fish, the teachings would likewise apply to non-feed particles for fish as well such as tablets containing drugs, vaccines and the like for the purpose of fish sustenance and welfare and it is intended to cover all such substances within the accompanying claims.

Likewise, although pellets are typically used as a feed and non-feed product and have been described in particular detail, other feeds and non-feeds in not pellet form such as pressed pellets and particle and moist feeds would clearly benefit from the teachings of the invention and are intended to be covered thereby.

Similarly, although a mica/titanium dioxide additive is described as an appropriate coating substance, all pigments as illustrated and described herein and other similar pigments which can be used to significantly increase the visibility of the feed or non-feed particle would be suitable for use according to the invention.

Many modifications will readily occur to those skilled in the art to which the invention relates and the specific embodiments described should be taken as illustrative of the invention only and not as limiting its scope as defined in accordance with the accompanying claims.

What is claimed is:

1. Method of feeding fish within the enclosure of a fish farm with enhanced visibility fish feed, said fish farm having an enclosure defined a volume having width, length, depth and a bottom, said bottom being defined by a perforated enclosure, said enhanced visibility fish feed being in the form of pellets having significantly improved visibility throughout a substantial portion of said volume of said enclosure included within said width, length, depth and bottom, relative to unenhanced visibility fish feed, said method comprising the steps of selecting said enhanced visibility fish feed in pellet form including a mica and/or titanium material thereby resulting in a substantially increased brightness and/or reflectivity relative to the brightness and/or reflectivity of said unenhanced visibility fish feed within said volume defined by said width, length, depth and bottom and distributing a quantity of said pellets including said mica and/or titanium material, of said enhanced visibility fish feed on the surface of the water in said enclosure so as to allow said fish feed to pass through said perforated enclosure if said fish feed is not eaten by said fish.

2. Method as in claim 1 wherein said enhanced fish feed having significantly improved visibility has a change in color relative to said unenhanced feed.

3. Method as in claim 2 wherein said color of said enhanced feed is white, silver or guanine.

4. Method as in claim 3 wherein said unenhanced fish feed is brown in color.

5. Method as in claim 1 wherein said significantly improved visibility of said pellets of said enhanced visibility fish feed relative to said pellets of said unenhanced visibility fish feed is defined by the response rate of fish within said enclosure to said visibility of said pellets of said enhanced visibility fish feed relative to the response rate of said fish to said pellets of said unenhanced visibility fish feed under similar conditions within said enclosure.

6. Method as in claim 5 wherein said significantly improved visibility of maid pellets of said enhanced visibility fish feed relative to said pellets of said unenhanced visibility fish feed is defined by said response rate of said fish to said pellets of said enhanced visibility fish feed being more than 50% greater than said response rate of said fish to said pellets of said unenhanced visibility fish feed.

7. Method as in claim 1 wherein said significantly improved visibility of said enhanced fish feed relative to said unenhanced feed is defined by the contrast of said enhanced fish feed relative to the contrast of said unenhanced fish feed against substantially similar backgrounds.

8. Method as in claim 7 wherein said significantly improved visibility is defined by said contrast of said enhanced fish feed relative to said unenhanced feed being more than twice the contrast of said unenhanced feed against substantially similar backgrounds.

* * * * *